June 18, 1957  B. C. PHENIX, JR  2,796,385
METHOD OF AVOIDING DILUTION OF SOLUTIZER SOLUTIONS
Filed May 14, 1953
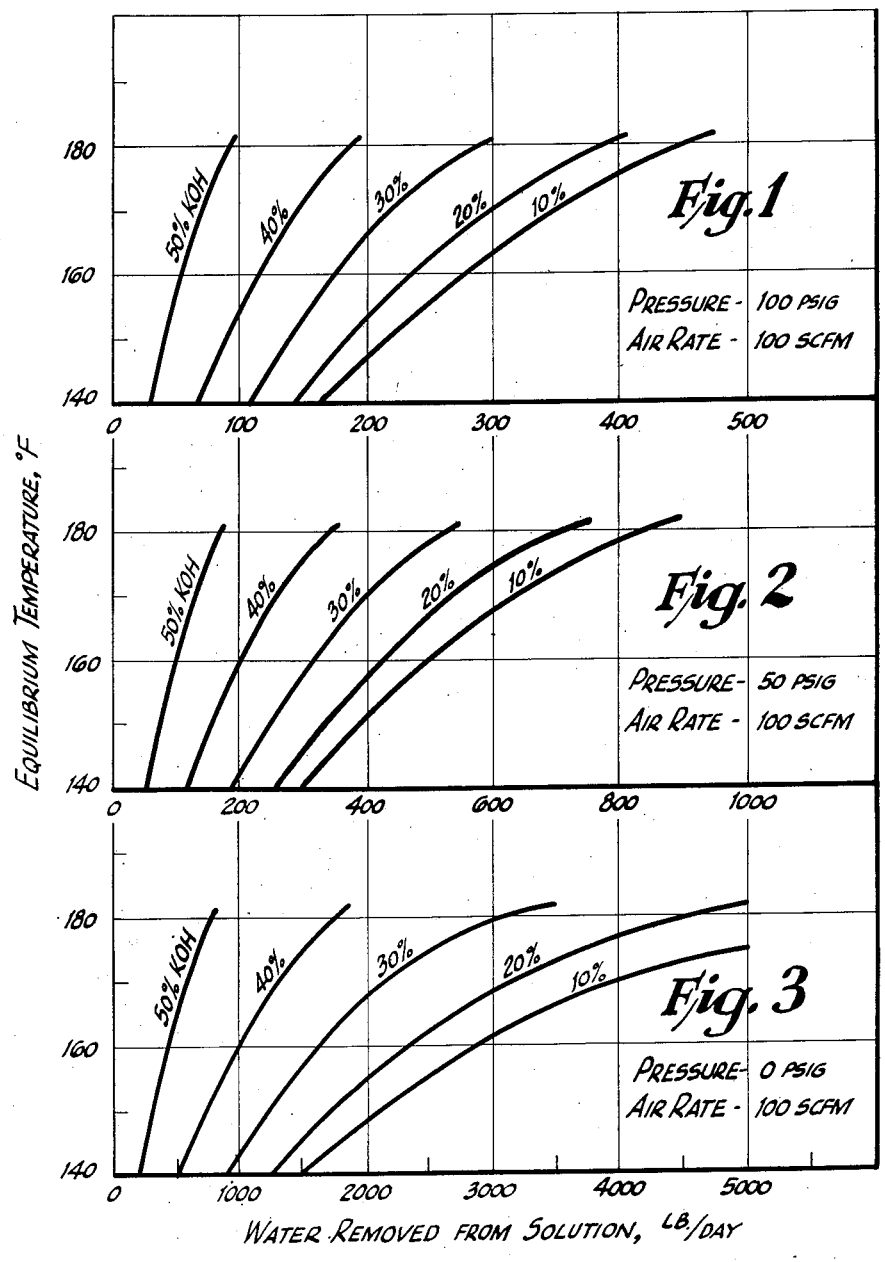
INVENTOR.
BRUCE C. PHENIX, JR.
BY
AGENT

United States Patent Office 2,796,385
Patented June 18, 1957

2,796,385

METHOD OF AVOIDING DILUTION OF SOLUTIZER SOLUTIONS

Bruce C. Phenix, Jr., Beaumont, Tex., assignor to Socony Mobil Oil Company, Inc., a corporation of New York Application May 14, 1953, Serial No. 354,944

1 Claim. (Cl. 196—32)

The present invention relates to the regeneration of alkaline solutions used to extract mercaptans from hydrocarbon fluids and, more particularly, to the regeneration by oxidation of alkaline solutions used to extract mercaptans from hydrocarbon fluids.

It is general practice to regenerate alkaline solutions used to extract mercaptans from hydrocarbon fluids such as naphthas including gasoline. While regeneration originally involved heating the fouled solution and blowing steam therethrough to decompose the alkali metal salts of the mercaptans, i. e., mercaptides to mercaptans, more recently regeneration of fouled alkaline solutions of this character has been achieved by oxidation of the mercaptides to disulfides with air in the presence of absence of a catalyst; for example, tannin. The regenerative reaction is presumed to be represented by the equation:

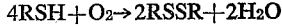

$$4RSH + O_2 \rightarrow 2RSSR + 2H_2O$$

In other words, for each 4 atomic weights of sulfur oxidized, 2 molecular weights of water are produced. Consequently, in the oxidation of 4,000 pounds of mercaptan sulfur per day to disulfides either in the presence of a catalyst such as tannin, or in the absence of such a catalyst at atmospheric or superatmospheric pressure, about 1,100 pounds of water per day are produced. Since the extraction of 4,000 pounds of mercaptan sulfur per day requires about 400,000 to about 500,000 pounds of alkali metal hydroxide solution containing about 50 to about 40 weight percent alkali metal hydroxide, it is manifest that the extracting solution will be diluted about 0.22 to about 0.28 percent per day with the water of reaction. Some water of dilution is also carried into the extraction solution from the more dilute prewash systems and from leakage of water into the system. As a consequence of this dilution by water of reaction and water carried over from the prewash or leaking into the system from external sources, the alkali metal hydroxide extracting system becomes dilute to such an extent that a solution having a density of about 49° Bé. will be diluted to a density of about 39° Bé. in about 50 days when regenerating by oxidation of about 4,000 pounds of mercaptan-sulfur per day. In other words, the dilution is about 0.05° Bé. per 1,000 pounds of mercaptan-sulfur per day. As a consequence of this dilution and reduced density, the extractive capabilities of the extraction solution decrease and the difficulty of separating the disulfide oils produced in the regeneration by oxidation increases. The amount of unseparated disulfide oil increases with dilution of the alkali metal hydroxide extracting solution. The unseparated disulfide oil contaminates the extracting solution and the contaminating disulfides are extracted from the extracting solution by the naphtha to be treated for the removal of mercaptans. Since the disulfides have an effect equally deleterious upon the lead sensitivity of the finished gasoline as mercaptans, incomplete separation of disulfide oil from the regenerated aqueous alkali metal hydroxide solution results in a finished gasoline of lowered lead sensitivity proportioned to the dilution of the aqueous alkali metal hydroxide treating solution.

In the regeneration of alkali metal hydroxide treating solutions by oxidation of the mercaptans contained therein with air, the water of dilution including water of reaction can be removed from the solution only as a vapor in the air discharged from the system. The amount of water that can be removed from the solution in this manner is a function of the regeneration temperature, the strength and composition of the solution, the vapor pressure of the treating solution in contact with the regenerating air and the equilibrium conditions existing between the air and solution. Consequently, when the quantity of water entering the solution either as water of reaction or from external sources exceeds the amount of water that can be removed during regeneration, the excess water dilutes the treating solution thereby reducing its useful life, extraction power, capability to separate from disulfide oil and increases treating costs. Two methods have been used to achieve partial removal of this water of dilution.

One method of removing a portion of this water of dilution is to increase the rate of flow of the air used for regeneration. This method has its limitations depending upon the capacity of the air-blowing equipment and the like. Furthermore, increasing the rate of flow of the regenerating air above that necessary to oxidize the mercaptans decreases the residence time of the solution-air mixture in the regeneration system and thereby reduce the amount of mercaptans oxidized per unit of time.

A second method of increasing the amount of water of dilution removed from the treating solution in the air discharged therefrom, involves installing a drier for the regenerating air up-stream of the regenerator to reduce to a minimum the moisture content of the air prior to the regenerator and thus increase the capacity of the air to remove the water of dilution. This method likewise has limitations depending upon the equipment.

Since separation of disulfide oil from regenerated treating solution is optimum, when the treating solution contains about 40 weight percent potassium hydroxide or about 37 weight percent, sodium hydroxide solutions of this strength are preferred. At regeneration temperatures generally employed, i. e., 130° to 150° F. at an air flow rate of 100 standard cubic feet per minute (S. C. F. M.), only about 400 to 750 pounds of water per day can be removed at 0 p. s. i. g., about 90 to about 150 pounds of water per day can be removed at 50 p. s. i. g., and about 50 to about 90 pounds of water per day can be removed at 100 p. s. i. g. On the other hand, in a system operated at 50 to 100 p. s. i. g., the solution is being diluted at the rate of about 500 to about 600 pounds of water per day, per 100 S. C. F. M. air flow. Thus, it is manifest that the removal of water of dilution from aqueous alkali metal hydroxide treating solutions is an important problem confronting the industry.

It has now been discovered that the water balance of an aqueous alkaline treating solution can be maintained and the water of dilution removed in a simple manner whereby the vapor pressure of the treating solution is raised so that the required additional water can be vaporized and discharged in the vented residual regenerating gas. Accordingly, it is an object of the present invention to regenerate aqueous alkaline treating solutions at temperatures in excess of 150° F. and a pressure from atmospheric to at least 100 p. s. i. g. This and other objects will become apparent from the following description taken in conjunction with the drawings in which Figures 1, 2 and 3 graphically illustrate the equilibrium between aqueous solutions of potassium hydroxide and moist air when the moist air passes through the solution at the rate of 100 S. C. F. M. at pressures of 100 p. s. i. g., 50 p. s. i. g. and 0 p. s. i. g., respectively.

The data for the curves shown in Figures 1, 2 and 3 were calculated using the following equations:

(1) $$H=\frac{18p}{29(P-p)} \text{ or } \frac{0.6207p}{P-p}$$

where $p$ = vapor pressure in mm. of mercury exerted by the solution in equilibrium with air at a given temperature;
$P$ = total pressure of system in mm. of mercury; and
$H$ = pounds of water absorbed per pound of dry air.

(2) $$W=(C)(A)(\Delta H)$$

where $W$ = pounds of water removed per day from the solution by the air;
$A$ = pounds of air per day in equilibrium with the solution;
$C$ = a constant depending upon the degree of equilibrium between the solution and the air and having a value of 0.4 to 1.0; and
$\Delta H$ = humidity of outlet air minus humidity of inlet air in pounds of water, per pound of dry air.

Since the graphs are based on 100 S. C. F. M. of bone dry air, A=11,000 pounds per day. Similar curves may be drawn for treating solutions having concentrations differing from those shown in Figures 1, 2 and 3 by using the equations given hereinbefore when the vapor pressure, temperature and concentration of alkali metal hydroxide are known.

Illustrative of the use of these curves is the application of the principles of the present invention to the regeneration system of a gasoline treating unit wherein 4,000 pounds of mercaptan sulfur are oxidized per day to disulfides in a treating solution containing 40 weight percent of potassium hydroxide. The optimum separation of disulfide oil from the regenerated treating solution is obtained when the solution contains 40 weight percent KOH. Accordingly, it is necessary to determine what the regeneration temperature should be to maintain a water balance in the system when the water of reaction is 1,100 pounds per day and the water carried into the treating solution from sources outside the regeneration system is 220 pounds per day, using a value of 1 for constant C in equation 2. (The organic acid content of the gasoline contacting the treating solution is negligible.)

Pressure of regeneration, p. s. i. g. _____ 50
Available air supply, S. C. F. M. _____ 408
Water of reaction $\left(4,000\times\frac{18}{2\times 32}\right)$, pounds/day __ 1100
Water carry-over from prewash, pounds/day ____ 220
Total water of dilution, pounds/day _____ 1320

Oxygen required to oxidize RSH–S (mercaptan-sulfur) is:

$$\frac{4,000\times 32}{4\times 32}=1,000 \text{ lbs./day}=8 \text{ S. C. F. M.}$$

Residual air equals fresh air minus oxygen to oxidize RSH–S or 408—8=400 S. C. F. M. Since the air flow rate is 400 S. C. F. M., 330 pounds of water per day must be removed per 100 S. C. F. M. From Figure 2 it can be determined that 330 pounds of water per day per 100 S. C. F. M. can be removed from a 40 weight percent KOH solution at a temperature of 180° F. and a pressure of 50 p. s. i. g.

On the other hand, it can be calculated that if the same 40 weight percent KOH treating solution were regenerated at 160° F. and 50 p. s. i. g., the treating solution would be diluted at the rate of 520 pounds of water per day since only 800 pounds of water would be removed per day at a regeneration temperature of 160° F. The solution strength would decrease from 40 weight percent KOH until the strength thereof was about 28 weight percent at which strength the rate of removal of water at 160° F. is about the same as that of a 40 weight percent KOH solution at 180° F. However, the disulfide oil cannot be separated as completely from a 28 weight percent KOH solution as from a 40 weight percent solution and the extracting power of the more dilute solution is only about 0.8 that of the 40 weight percent solution.

However, when regenerating the 40 weight percent KOH solution at 180° F. and 100 p. s. i. g. with 400 S. C. F. M., the water removed is reduced to 740 pounds per day. This can be readily determined from Figure 1 from the fact that at 100 S. C. F. M. at 100 p. s. i. g. and 180° F., 185 pounds of water per day are removed from a 40 weight percent KOH solution. Hence, at the rate of 400 S. C. F. M. about 740 pounds of water per day will be removed from a 40 weight percent KOH solution at 100 p. s. i. g. and 180° F.

Accordingly, the present invention provides an improvement in the method of regenerating aqueous alkali metal hydroxide solutions employed in the extraction of weakly acidic sulfur compounds from hydrocarbon fluids wherein a fouled aqueous alkali metal hydroxide solution containing alkali metal salts of said weakly acidic sulfur compounds is regenerated by passing gas containing free oxygen through said fouled aqueous solution at temperatures of about 130° to about 150° F. to oxidize said alkali metal salts to polysulfides and separating the polysulfides thus formed from the aqueous alkali metal hydroxide solution to obtain regenerated treating solution and contacting hydrocarbon fluid containing weakly acidic sulfur compounds with said regenerated treating solution. Said improvement comprising contacting said fouled treating solution with gas containing free oxygen such as air at temperatures in excess of 150° F. but below the boiling temperature of said aqueous treating solution, preferably at temperatures of about 160° to about 180° F. with sufficient air to regenerate said aqueous solution at a residence time of about 7 to about 15 minutes preferably not in excess of about 400 S. C. F. M. to remove sufficient water from said treating solution to maintain the concentration of alkali metal hydroxide therein substantially constant.

I claim:

In the method of regenerating diluted aqueous alkali metal hydroxide treating solutions which have been employed to extract mercaptans from hydrocarbon fluids and which originally had alkali metal hydroxide concentrations of 37 to 50 weight percent where in said diluted treating solution containing water of dilution and mercaptides is contacted with gas containing free oxygen in excess of the stoichiometric equivalent of said mercaptides to convert said mercaptides to disulfides and concomitantly produce water of reaction to produce a diluted regenerated treating solution, wherein said produced disulfides are separated from said diluted regenerated treating solution, and wherein hydrocarbon fluid containing mercaptans is contacted with said regenerated treating solution, the improvement which comprises contacting a diluted aqueous potassium hydroxide treating solution containing water of dilution and mercaptides at a regeneration pressure of about 50 p. s. i. g. at a temperature of about 180° F. with air at a flow rate of about 400 S. C. F. M. to convert said mercaptides to disulfides and to remove said water of dilution and said water of reaction in about 7 to about 15 minutes and to concentrate said diluted treating solution to the original potassium hydroxide concentration of about 40 weight percent.

References Cited in the file of this patent

UNITED STATES PATENTS

| | | |
|---|---|---|
| 2,001,715 | Fischer | May 21, 1935 |
| 2,316,759 | Bond | Apr. 20, 1943 |
| 2,317,054 | Henderson et al. | Apr. 20, 1943 |
| 2,426,087 | Fetterly | Aug. 19, 1947 |
| 2,431,770 | Payne et al. | Dec. 2, 1947 |
| 2,432,301 | Fetterly | Dec. 9, 1947 |
| 2,451,817 | Fetterly | Oct. 19, 1948 |
| 2,550,905 | Bolt et al. | May 1, 1951 |
| 2,719,109 | Harper | Sept. 27, 1955 |